US009108598B2

(12) United States Patent
Headley

(10) Patent No.: US 9,108,598 B2
(45) Date of Patent: Aug. 18, 2015

(54) SYSTEM AND METHOD FOR MANEUVERING A VEHICLE-TRAILER UNIT IN REVERSE TRAVEL

(75) Inventor: Philip Mark Headley, Brighton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/005,644

(22) Filed: Jan. 13, 2011

(65) Prior Publication Data

US 2012/0185131 A1    Jul. 19, 2012

(51) Int. Cl.
| | | |
|---|---|---|
| *B62D 13/00* | (2006.01) | |
| *B62D 53/00* | (2006.01) | |
| *B60T 8/17* | (2006.01) | |
| *B60D 1/24* | (2006.01) | |
| *B60D 1/62* | (2006.01) | |
| *B62D 13/06* | (2006.01) | |
| *B62D 15/02* | (2006.01) | |

(52) U.S. Cl.
CPC .............. *B60T 8/1708* (2013.01); *B60D 1/245* (2013.01); *B60D 1/62* (2013.01); *B62D 13/06* (2013.01); *B62D 15/027* (2013.01); *B60T 2230/08* (2013.01)

(58) Field of Classification Search
CPC ........ B62D 6/003; B62D 6/008; B62D 7/159; B62D 13/00; B62D 13/06; B62D 15/025; B62D 15/027; B62D 53/0871; B60T 2230/08
USPC ........... 701/1, 41, 36; 180/9.4, 14.9; 280/412, 280/416.2, 423.1, 446.1, 447, 448
See application file for complete search history.

(56) References Cited

U.S. PATENT DOCUMENTS

| | | | | | |
|---|---|---|---|---|---|
| 5,247,442 | A | * | 9/1993 | Kendall | ........................... 701/41 |
| 5,579,228 | A | * | 11/1996 | Kimbrough et al. | ............ 701/41 |

(Continued)

FOREIGN PATENT DOCUMENTS

| | | |
|---|---|---|
| DE | 19834752 A1 | 7/1999 |
| DE | 19953413 A1 | 2/2001 |

(Continued)

OTHER PUBLICATIONS

Anonymous, Device to assist in backing up a trailer, Research Disclosure, 1991, vol. 323, No. 101, Mason Publications, Hampshire, GB.

(Continued)

*Primary Examiner* — Jack W Keith
*Assistant Examiner* — Chuong P Nguyen

(57) ABSTRACT

A system and method of maneuvering a vehicle-trailer unit in reverse travel uses at least one sensor generating output information representative of the a relative position between the vehicle rear and the trailer front. An electronic processing unit compares the measured quantity with a reference value and determines from the comparison whether the trailer deviates from a straight alignment with the vehicle. If the trailer is not aligned with the vehicle, the system can interfere with the vehicle's steering system, the trailer's brake system, or both. The sensor can be a distance sensor or a camera, and the quantity can be a distance or a marker position. As a reference value for comparison, the method can use a stored value or previously or simultaneously measured values. The method can be activated automatically or by a switch operated by the vehicle driver.

18 Claims, 3 Drawing Sheets

(56) References Cited

U.S. PATENT DOCUMENTS

| | | | |
|---|---|---|---|
| 6,292,094 B1* | 9/2001 | Deng et al. | 340/431 |
| 6,854,557 B1* | 2/2005 | Deng et al. | 180/445 |
| 7,154,385 B2* | 12/2006 | Lee et al. | 340/431 |
| 7,463,137 B2* | 12/2008 | Wishart et al. | 340/431 |
| 7,612,657 B2* | 11/2009 | Kim | 340/431 |
| 7,715,953 B2* | 5/2010 | Shepard | 701/1 |
| 7,904,222 B2* | 3/2011 | Lee et al. | 701/41 |
| 8,755,984 B2* | 6/2014 | Rupp et al. | 701/70 |
| 2004/0017285 A1* | 1/2004 | Zielinski et al. | 340/431 |
| 2004/0021291 A1* | 2/2004 | Haug et al. | 280/455.1 |
| 2005/0000738 A1* | 1/2005 | Gehring et al. | 180/14.1 |
| 2007/0027581 A1* | 2/2007 | Bauer et al. | 701/1 |
| 2007/0252359 A1* | 11/2007 | Wishart et al. | 280/477 |
| 2008/0231701 A1* | 9/2008 | Greenwood et al. | 348/148 |
| 2009/0198425 A1* | 8/2009 | Englert | 701/70 |
| 2011/0018231 A1* | 1/2011 | Collenberg | 280/448 |

FOREIGN PATENT DOCUMENTS

| | | |
|---|---|---|
| DE | 10065230 A1 | 7/2002 |
| DE | 10325192 A1 | 1/2005 |
| DE | 10200422113 A1 | 11/2005 |
| DE | 102004025252 A1 | 12/2005 |
| DE | 102006002294 A1 | 7/2007 |
| DE | 102006008071 A1 | 9/2007 |
| EP | 1234740 A2 | 8/2002 |

OTHER PUBLICATIONS

PCT/US2012/050618 PCT International Search Report and Written Opinion of the International Searching Authority.
English Abstract DE 198 34 752.
English Abstract DE 103 25 192.
English Abstract DE 10 2006 002 294.
English Abstract 10 2004 022 113.
English Abstract 10 2004 025 252.

* cited by examiner

SYSTEM AND METHOD FOR MANEUVERING A VEHICLE-TRAILER UNIT IN REVERSE TRAVEL

FIELD OF THE INVENTION

The present invention is related to a method, system and electronic processing device for maneuvering a towing vehicle and a connected trailer when the vehicle-trailer unit is in the process of backing up.

BACKGROUND OF THE INVENTION

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

SUMMARY OF THE INVENTION

It is an object of the present invention to stabilize a vehicle-trailer unit when traveling in the reverse.

This object is achieved by a method using at least one sensor measuring a quantity that provides information about the angle between the vehicle's longitudinal axis and the trailer's longitudinal axis.

This can be accomplished with at least one distance sensor generating output information representative of the distance between the front of the trailer and the rear of the vehicle at a location that is laterally offset from the location of the trailer hitch, by establishing at least one distance value and determining the difference between the distance value and a reference value. If the difference exceeds a predetermined threshold, a path-correcting measure is implemented. Such a sensor can be mounted on the rear of the vehicle or on the front of the trailer.

Another option is to observe a representative angle. One possibility is to measure the rotation of the hitch, either with a sensor integrated into the hitch or with an imaging device. It is also possible to measure the angle between the trailer tongue and the longitudinal axis of the towing vehicle. A rear- and downward-facing sensor or camera can be placed in an elevated position on the rear of the vehicle and monitor the angular position of the central beam of the trailer tongue. Similarly, a rear-facing sensor or camera can monitor the lateral position of a reference marker affixed to the trailer. The marker may be anything that is optically distinguishable from the environment, even an existing trailer part or pattern.

Any type of sensor capable of generating information representing a distance or a position, such as an angular position, can be utilized to perform the method. Such sensors can work within the infrared spectrum, visible spectrum, radar spectrum, or any other suitable frequency range. Instead of electromagnetic waves, longitudinal material waves could be emitted and detected for distance measurement, for instance by using ultrasound or waves in a different range of the acoustic spectrum. The sensors may simply indicate distances, detect positions of reference markers, generate an image like a camera or measure an angle. Thus, the term "sensor" as used in this specification encompasses imaging devices as well.

If the distance between the rear of the vehicle and the front of the trailer during straight travel is known, one distance sensor is sufficient to measure a deviation caused when the trailer deviates from a straight path and moves in an angle relative to the vehicle. But if the distance between the rear of the vehicle and the front of the trailer during straight travel is not known, e.g. if the vehicle tows different types of trailers, then two sensors spaced laterally apart can be used.

A mathematically simple arrangement for the variation using two variable distance measurements is to place the two sensors at equal distances from the trailer hitch, one to the left and one to the right. If they both measure the same distance, the trailer is traveling straight. If the signals of the two distance sensors are different, the trailer's path deviates from a straight line toward the side of the shorter measured distance between vehicle rear and trailer front.

The distance between the vehicle and the trailer need not be known if an angle is measured. The longitudinal vehicle axis ideally coincides with the central horizontal direction of a rear-facing, vehicle-mounted sensor's detection area. If the angle between the trailer tongue and the vehicle's longitudinal axis deviates from 180 degrees, this deviation corresponds to the angle between the vehicle's back and the trailer's front.

A rear-facing sensor mounted on the vehicle monitoring a reference marker on the trailer may alternatively indicate the lateral deviation distance of this marker from a normal position. If the sensor is mounted laterally centered on the rear of the vehicle and the marker is at a laterally central location on the trailer, the deviation measured is symmetric on both sides, and the deviation d divided by the distance between trailer hitch and marker constitutes the sine value of the angle between the trailer's and the vehicle's longitudinal axes.

Such a deviation can be corrected by an intervention into the vehicle's steering system, where the steering wheel angle is automatically corrected to bring vehicle and trailer into alignment with each other.

Because an angle between trailer and vehicle is sometimes what the driver intended, for instance when backing up into a driveway, the corrective system should not interfere with a driving maneuver, unless indicated by the vehicle driver. Such an indication can be accomplished by the driver giving a manual input through an interface or by the system itself after observing the driver's behavior.

Further details and aspects of the invention will become apparent from the description of the accompanying drawings.

DETAILED DESCRIPTION OF THE DRAWINGS

Figure 1:
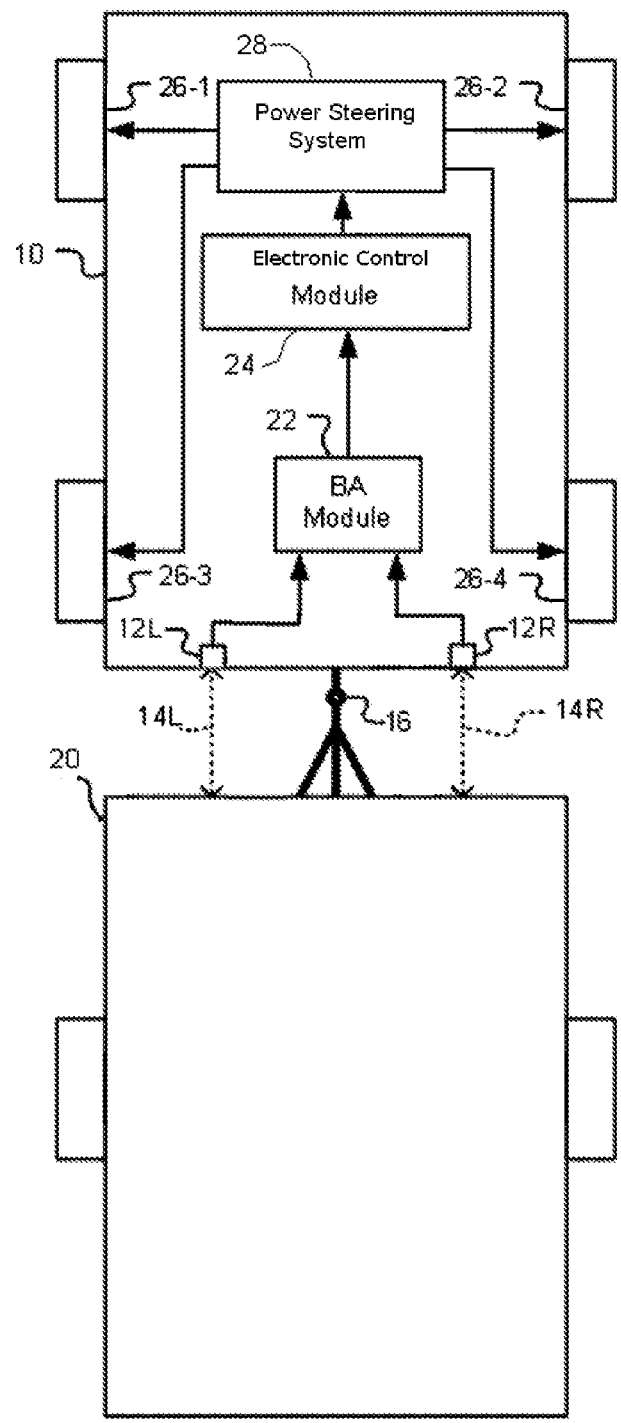
FIG. 1 shows a schematic view of a vehicle towing a trailer with two rear-facing distance sensors mounted on the vehicle.

In FIG. 1, a vehicle 10 is towing a trailer 20. The trailer 20 is connected to the vehicle 10 through trailer hitch 16, which allows the trailer to swivel horizontally around the vertical axis of the trailer hitch 16, which is the axis vertical to the drawing plane.

Two backward-looking distance sensors 12L and 12 R are located at the rear of the vehicle 10. They measure the distances 14L and 14R between the rear of vehicle 10 and the front of the trailer 20 at their respective locations left and right of the trailer hitch 16. The information generated by the distance sensors 12L and 12R is sent to a back-up assistance module (BA Module) 22. The back-up assistance module 22 compares the two pieces of information from the distance sensors 12L and 12R.

For simplicity purposes, it is assumed here that distances 14L and 14R are equal if the trailer 20 is in a straight line with the vehicle 10. But this need not be the case. Once a trailer is mounted, the driver can initiate the back-up system to take a "snapshot" of the prevailing distances 14L and 14R when vehicle and trailer are aligned along the same axis. Alternatively, the back-up assistance module can learn over the course of forward travel what those distances 14L and 14R are when the vehicle is moving straight forward. When the distances 14L and 14R differ from each other during straight travel, an offset distance value can be added to either one or both of the distances to make them equal for further calculations.

The back-up assistance module 22 communicates with an electronic control module 24. The electronic control module 24 is an electronic processing unit controlling an active power steering system 28 that is capable of actively changing a steering angle of front axle wheels 26-1 and 26-2 without the vehicle driver giving a respective input through the vehicle steering wheel. The active power steering system 28 may also include the capability of additionally steering the rear axle wheels 26-3 and 26-4. The electronic control module 24 computes corrective actions to be taken in order to maneuver the vehicle and initiates the power steering system 28 accordingly.

Figure 2:
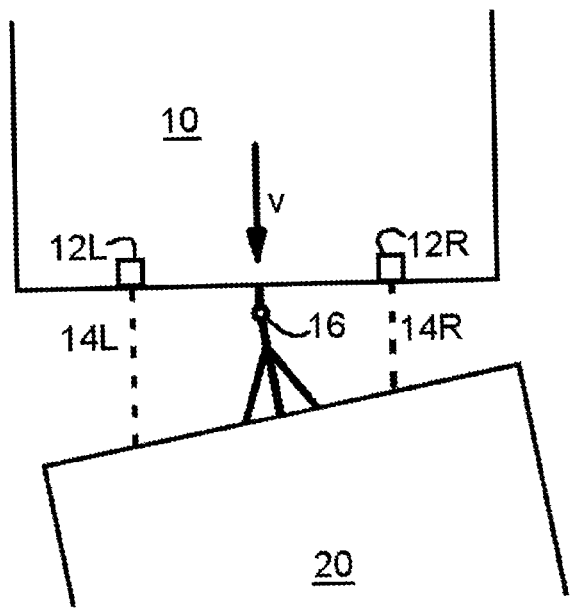
FIG. 2 shows such a vehicle-trailer unit in which the trailer deviates from a straight course.

FIG. 2 shows a situation in which the trailer 20 breaks out to the right vehicle side—making a counterclockwise turn—while being pushed in the reverse. The trailer 20 is not aligned with the vehicle 10 at this time. As shown by the broken lines, the distance sensor 12L on the left side of the trailer hitch 16 will measure a longer distance 14L between the rear of the vehicle 10 and the front of the trailer 20 than the distance sensor 12R on the right side of the trailer hitch 16. If the vehicle 10 continues to travel in the direction v, the trailer will jackknife. Thus corrective action should be taken. For a driver who only drives a vehicle with an attached trailer occasionally, it is quite difficult to find the proper steering angle to bring the trailer 20 back into alignment with the vehicle 10 as shown in FIG. 1.

The back-up assistance module 22, receiving the information from the rear-facing distance sensors 12L and 12R, calculates the angle between the vehicle 10 and the trailer 20 from the two distances 14L and 14R. If the actual angle between the vehicle and the trailer differs from an intended angle by an amount greater than a stored threshold value, the power steering system 28 applies a corrective steering angle. The threshold value corresponds to a difference caused by a relatively small angle of at most 10°. The smaller the stored threshold value is, the more sensitive the control will be. The exact threshold value may be empirically determined to best satisfy a driver's need. It could also be set by the driver of the respective vehicle 10.

Once the back-up assistance module 22 has determined that the threshold value is exceeded, the back-up assistance module 22 or the electronic control module 24 or both compute what the appropriate counter measure should be, and the electronic control module 24 controls the vehicle's power steering system 28 to carry out those counter measures.

The vehicle shown in FIG. 1 has an active steering system, i.e. a steering system that can automatically change the driver-chosen steering angle to fit a current driving situation. For such vehicles, it is possible to add a right-turn steering angle to the steering angle indicated by the vehicle driver through vehicle's steering wheel (not shown). The power steering system 28 can change the angular position of the steering wheel to adopt a steering angle at the front wheels 26-1 and 26-2 and optionally at the rear wheels 26-3 and 26-4. Alternatively, this added steering angle could be superimposed at the vehicle's wheel level on the steered axle or axles, typically the front axle, without affecting the steering wheel held by the driver. The added right-turn steering angle would be applied until the vehicle has made a counter-clockwise movement sufficient to return the trailer 20 to its intended position. Then a slight left-turn steering angle could be added to turn the vehicle-trailer unit into the intended direction to continue with the back-up maneuver.

The back-up maneuver may also be automatically performed in a closed feedback loop to independently back up the vehicle without driver input at all. The driver can be given the possibility to override the maneuver or to disable the function manually.

While the drawing shows the back-up assistance module 22 separate from the electronic control module 24 and from the power steering system 28, these three modules can obviously be integrated into one or two processing units cooperating to perform the described functions. The back-up assistance module 22 can be an after-market add-on.

Not shown is an optional additional camera mounted at the rear of the trailer and facing backward. Such a camera could further aid the driver of the vehicle if the direct view in the driving direction is obstructed while traveling in the reverse.

The figures are only exemplary for one of many embodiments of the invention. For instance, it is apparent that a steering intervention could also be performed on a trailer with at least two axles, of which at least one is steerable. Likewise, if the towing vehicle has more than one steerable axle, the intervention could be performed on both steerable axles.

The method of the invention does not require two distance sensors if the distance between the rear of the vehicle at the location of the sensor and the front of the trailer is known for straight travel or for an intended angle between vehicle and trailer. Then the deviation from the known distance is compared with a predetermined threshold value. Naturally, this threshold value would be about half of the threshold value of the two-sensor embodiment discussed above.

Figure 3:
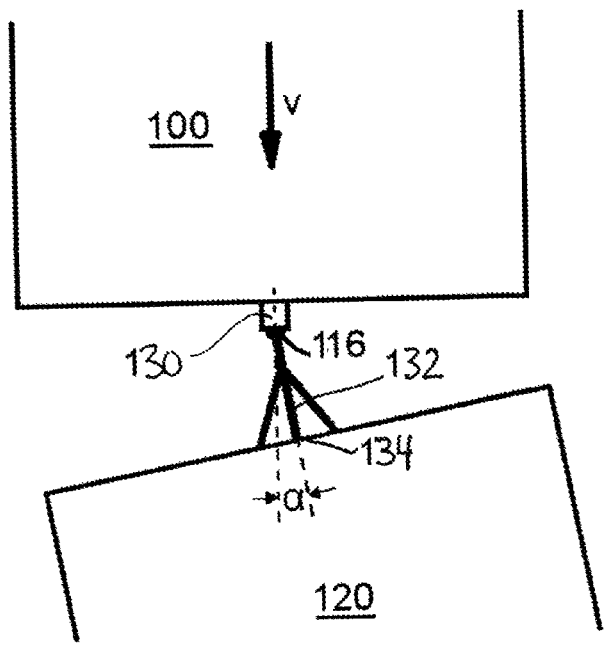
FIG. 3 shows a vehicle-trailer unit measuring the angle between vehicle and trailer through measuring the lateral deviation of a marker with a camera.

In the embodiment of FIG. 3, a camera 130 monitors the movement of trailer tongue 132 for a deviation from the vehicle's longitudinal axis indicated by the arrow v. To this end, the camera 130, mounted on the rear of the vehicle 110, detects a deviation of a marker 134 at a laterally central location affixed to the trailer 120. This marker can be a part of the trailer tongue itself or a patch or tape in a contrast color. Because the trailer 120 rotates horizontally about the trailer hitch 130, the measured lateral distance of the marker 134 from a central position divided by the distance between the trailer hitch 116 and the marker 134 establishes the sine value of the deviation angle $\alpha$ between the vehicle's longitudinal axis and the trailer's longitudinal axis. The trailer hitch 116, being fixed with respect to both the vehicle 110 and the trailer 120, constitutes the vertex of the deviation angle $\alpha$.

The camera 130 can be preadjusted to have a central marker reference position stored in advance to mark straight travel.

But the back-up assistance module 122 or the electronic control module 124 or both may also be able to learn the central marker reference position over time from trip data that have been acquired before the vehicle 110 starts its back-up maneuver.

Figure 4:
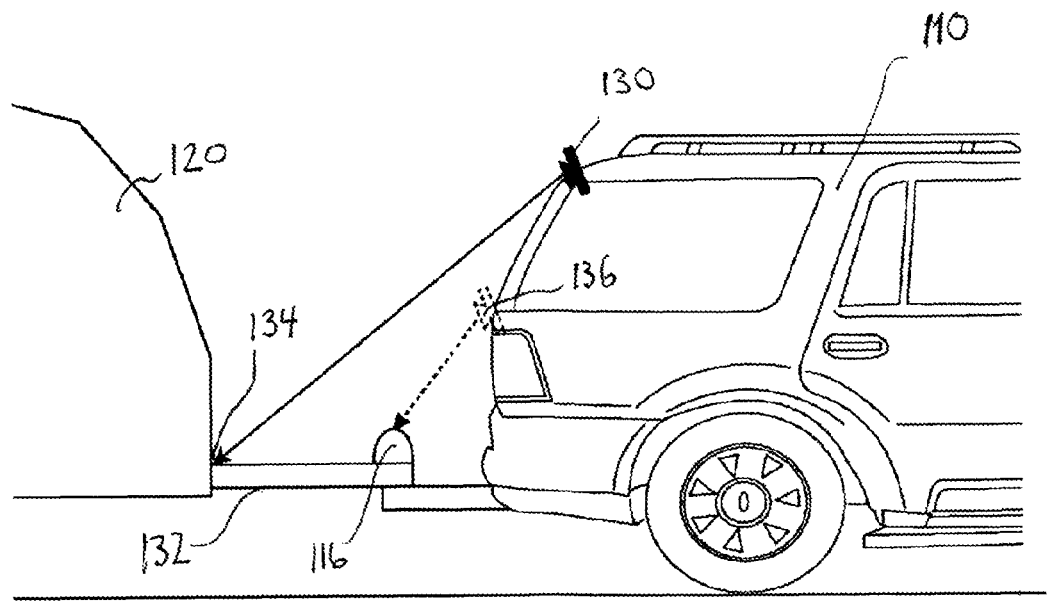
FIG. 4 shows an arrangement similar to FIG. 3, where a camera monitors the trailer hitch.

As shown in FIG. 4, camera 130 can be mounted at an elevated position approximately corresponding to the height of the passenger compartment roof on the rear of vehicle 110. The camera may observe marker 134 fixed on the front of the trailer 120 or record an image that is processed by the back-up assistance module to calculate angle α between trailer 120 and vehicle 110. But the camera may alternatively be mounted in a lower position 136, as indicated with broken lines. Such a lower mounting position may be necessary if the vehicle is, for instance, a pickup truck that does not allow camera 130 to be mounted in the elevated position.

Figure 5:
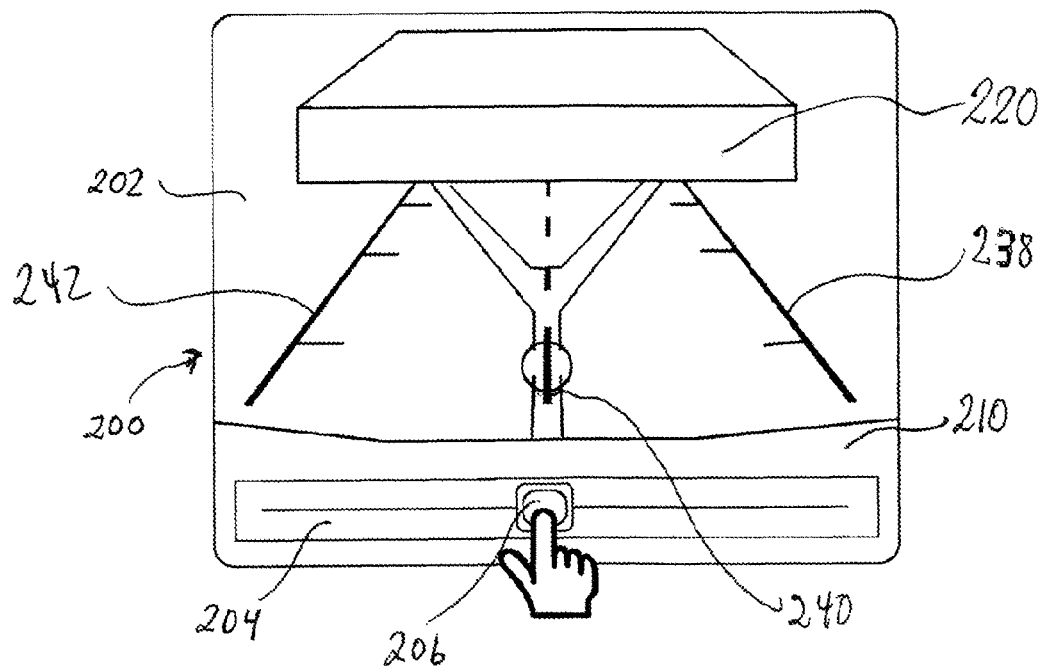
FIG. 5 is an illustration of an interface through which the vehicle driver can control the back-up maneuver.

FIG. 5 shows another embodiment, in which the driver of vehicle 210 may direct the back-up assistance module to move trailer 220 in a specific direction that is not necessarily in straight alignment with vehicle 210. The driver can give an input on the intended direction through an interface 200. The depicted interface 200 comprises a monitor portion 202 and an input portion 204. The input portion 204 is configured as a slider 206 that can be manually moved horizontally to the left or to the right to indicate the intended direction of the trailer 220. The slider 206 can be a physical slider or a slider image with a touch-sensitive surface. The monitor portion 202 shows a video stream of the movement of trailer 220 as recorded by a rear-facing camera mounted on the vehicle 210. The bottom edge of the monitor image shows the rear of the vehicle 210. The monitor portion 202 may further include virtual guides 238, 240 and 242. In the shown embodiment, virtual guide 240 indicates the direction of straight alignment between vehicle and trailer. Guides 238 and 242 contain distance markers to give the driver an intuitive measure of determining the angle between vehicle 210 and trailer 220 by being able to compare the distance of the trailer's right side from the vehicle 210 with the distance of the trailer's left side from the vehicle 210. The two virtual guides 238 and 242 may have differently colored sections to show the driver safe, intermediate and risky relative distances between each side of the trailer 220 and the vehicle 210.

The broad teachings of the disclosure can be implemented in many ways not specifically pointed out. Accordingly, the true scope of the disclosure is not limited to the particular examples discussed in detail. Further modifications become apparent by studying the drawings, the specification, and the following claims.

What is claimed is:

1. A method of maneuvering a vehicle-trailer unit in reverse travel comprising the steps of:
   providing a trailer having a front with a trailer tongue and a vehicle having a rear with a trailer hitch, the trailer tongue being connected to the trailer hitch allowing a horizontal swivel movement of the trailer around the hitch;
   providing an electronic processing unit having a back-up assistant module and power steering control feature integrated into the electronic processing unit;
   providing at least one distance sensor connected to the vehicle and configured to send information to the at least one electronic processing unit;
   providing an active power steering system in the vehicle;
   determining that the vehicle-trailer unit is backing up;
   measuring with said at least one distance sensor a quantity representing a relative position between the vehicle rear and the trailer front;
   generating output information from said at least one distance sensor to the electronic processing unit, wherein said output information is representative of the distance between the front of the trailer and the rear of the vehicle at least at a location that is laterally offset from the location of the trailer hitch, by establishing at least one distance value in determining the difference between the distance value and a reference value;
   comparing the measured quantity with a reference value using the electronic processing unit;
   determining in the electronic processing unit an intended path of the trailer with respect to the vehicle based upon an input that is independent of a steering wheel for the vehicle;
   using the electronic processing unit to determine whether the trailer deviates from the intended path with respect to the vehicle and calculating the deviation;
   determining with the electronic processing unit whether the deviation exceeds a predetermined threshold and using the electronic processing unit to control; and
   implementing a path-correcting measure using the electronic processing unit to command a steering system to correct the course of at least one of the vehicle and the trailer while the vehicle-trailer unit is in reverse travel when the deviation exceeds the predetermined threshold.

2. The method of claim 1, wherein the vehicle has the steering system with active steering intervention and the path-correcting measure adds a corrective steering angle to an existing steering angle.

3. The method of claim 1, wherein the measured quantity is representative of the distance between the front of the trailer and the rear of the vehicle at a location laterally offset from the location of the trailer hitch.

4. The method of claim 3, wherein the reference value represents the distance between the rear of the vehicle and the front of the trailer when the vehicle and the trailer are in straight alignment at the location where the quantity is measured.

5. The method of claim 3, wherein the the at least one distance sensor is a first and a second distance sensor laterally spaced from each other and generating output information representative of the distance between the front of the trailer and the rear of the vehicle, and wherein measured quantity is a distance value established from the output information of the first sensor and the reference value is a distance value established from the output information of the second distance sensor.

6. The method of claim 1, wherein the vehicle has a driver-operable back-up assistance switch activating an automatic back-up, the method including the step of detecting that the switch has been set to activate the method.

7. The method of claim 1, wherein the vehicle includes a manual interface generating input information representative of the intended path, the method comprising the step of determining the intended path from the generated input information.

8. The method of claim 1, wherein the measured quantity is the lateral position of a marker fixed on the front of the trailer and the reference value is the location of the marker when trailer and vehicle are in straight alignment.

9. The method of claim 1, wherein the measured quantity is an angle representing a deviation of the trailer from a straight alignment with the vehicle and the reference value is an angle representing a deviation of the trailer from the straight alignment with the vehicle when the trailer is on the intended path.

10. A system for maneuvering a vehicle-trailer unit in reverse travel comprising:
- a trailer having a front and a vehicle having a rear, the front and the rear being connected with a trailer hitch allowing a horizontal swivel movement of the trailer around the hitch,
- at least one first distance sensor configured to measure a quantity representing a relative position between the rear of the vehicle and the front of the trailer; and
- a back-up assistance module that receives information sent from the at least one distance sensor compares the measured quantity with a reference value, determines from the comparison that the trailer deviates from the intended path and calculate the deviation, the back-up assistance modules then inputs an intended path of the trailer with respect to the vehicle that is independent of a steering wheel for the vehicle by sending intended path information to an electronic processing unit;
- the electronic processing unit having a power steering control feature integrated into the electronic processing unit, the electronic processing unit is programmed to control a power steering system of the vehicle and implement a path-correcting measure correcting the course of at least one of the vehicle and the trailer while the vehicle-trailer unit is in reverse travel when the deviation exceeds the predetermined threshold.

11. The system of claim 10, further comprising a second distance sensor configured to generate output information representative of the distance between the front of the trailer and the rear of the vehicle.

12. The system of claim 10, wherein the first sensor is a camera configured to be mounted on the vehicle.

13. The system of claim 10, further comprising a back-up assistance activation switch communicating with the electronic processing unit to start to perform the program.

14. The system of claim 10, further comprising a manual interface generating input information representative of the intended path.

15. The electronic processing device of claim 14, wherein the measured quantity represents a distance.

16. The electronic processing device of claim 14, wherein the measured quantity represents a location of a marker.

17. The electronic processing device of claim 14, wherein the measured quantity represents an angle.

18. An electronic processing unit comprising:

a back-up assistant module and a power steering control feature both integrated into the electronic processing unit;

the back-up assistant module is programmed to receive information of a measured quantity representative of the position of a trailer relative to a position of a vehicle, compares the measured quantity with a reference value and determines from the comparison that the trailer deviates from an intended path, wherein the intended path of the trailer with respect to the vehicle is input from the backup assistant module to the electronic processing unit and the power steering control feature then controls power steering system to calculate a path-correcting measure correcting the course of at least one of a vehicle and a trailer independent of a steering wheel for the vehicle.

* * * * *